Figure 1:
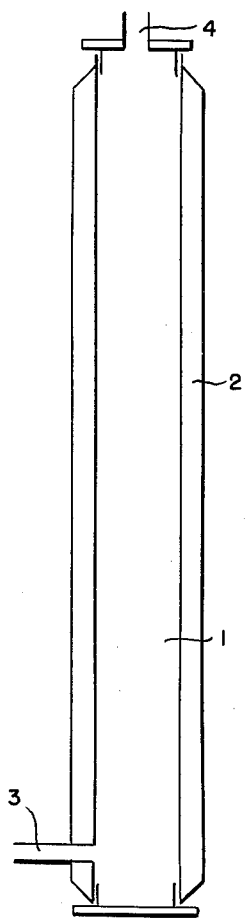

July 16, 1963

E. SIGGEL ET AL 3,098,046
METHOD OF PREPARING FINELY DIVIDED POLYETHYLENE
TEREPHTHALATE FROM POLYETHYLENE
TEREPHTHALATE SCRAPS
Filed April 12, 1960

INVENTORS:
ERHARD SIGGEL
LOTHAR RIEHL
BY *Marzall, Johnston,
Cook & Root*

ATT'YS

United States Patent Office 3,098,046
Patented July 16, 1963

3,098,046
METHOD OF PREPARING FINELY DIVIDED POLY-ETHYLENE TEREPHTHALATE FROM POLY-ETHYLENE TEREPHTHALATE SCRAPS
Erhard Siggel, Laudenbach am Main, and Lothar Riehl, Obernburg am Main, Germany, assignors to Vereinigte Glanzstoff-Fabriken AG., Wuppertal-Elberfeld, Germany
Filed Apr. 12, 1960, Ser. No. 21,629
Claims priority, application Germany Apr. 18, 1959
3 Claims. (Cl. 260—2.3)

The present invention relates to an improved process for treating polyethylene terephthalate scraps. More particularly, the subject invention is directed to an improved method of forming finely divided polyethylene terephthalate from polyethylene terephthalate scraps.

Polyethylene terephthalate is prepared in two stages. Initially, dimethyl terephthalate or terephthalic acid is condensed with ethylene glycol to form the diglycol ester of terephthalic acid by means of an ester interchange. A certain amount of a low molecular weight precondensate is also formed at this time. Thereupon, the temperature of the reaction is raised and a vacuum is applied to the system to produce a polycondensate by splitting off methanol or water. Both the ester interchange reaction and the polycondensation require the use of particular catalysts if the processes are to be completed within a reasonable period of time. The most frequently used catalysts for the ester interchange are magnesium acetate, zinc acetate, manganese acetate, and lead oxide. The catalysts that are commonly employed for the polycondensation stage of the reaction are antimony trioxide, lead oxide, and boron trioxide.

The polymer obtained by the above process is spun from the melt. The resultant fibers are stretched to give a highly oriented material and are then employed in preparing various products.

In commercial operations utilizing polyethylene terephthalate fibers as well as fibers formed from other polymers, a considerable amount of scrap is produced. A number of methods have been devised by which starting materials can be recovered from this scrap.

Inasmuch as polyethylene terephthalate scrap is difficult to process in its normal physical state, it is helpful to convert the material initially into a powder. The powder can be mashed to pulp form, in which state it is easily handled. A simple mechanical reduction of stretched or unstretched threads or fibers into powder, however, is unsatisfactory because of the large amount of force needed and because of the attendant material wear.

In order to overcome the disadvantages of mechanically reducing polyethylene terephthalate scrap to powder, methods have been devised which include a chemical decomposition of the polyester mass. In such methods the scrap is treated with an alkaline solution in the presence of amines whose dissociation constants are greater than $10^{-5}$, or in the presence of amines which are vaporized with steam in order to act on the polyester. Although in these processes the polymer is precipitated in powder form, the use of amines causes very serious purification problems. Considerable effort must be expended to remove the amines from the powder before the material can be processed into a spinnable compound.

It is an object of the present invention to provide an improved method of converting polyethylene terephthalate scrap into a powder.

Another object of the invention is to provide a method of treating polyethylene terephthalate scrap which does not require the use of amines or other disadvantageous additives.

Other objects will become apparent to those skilled in the art from the following detailed description of the invention.

In general, the subject invention comprises the discovery that it is possible to produce a finely divided polyethylene terephthalate material by passing superheated steam through polyethylene terephthalate scrap. The temperature of the steam should be at least 3° C. under the melting point of the polymer. The steam-scrap contact is maintained until the relative viscosity of the polymer has been lowered to less than about $\eta_{rel}$ 1.4. At this point the hot material is mechanically reduced to a powder.

In treating the fiber scraps with superheated steam the polyester undergoes a slight amount of decomposition. The fibers become brittle and can be converted to powder in a simple manner while they are still hot. The degree of brittleness caused by the decomposition is evidenced by the change in the viscosity of the polymer (the viscosity measurements are taken in 1% metacresol solution at 25° C.). The viscosity should be less than $\eta_{rel}$ 1.4 and preferably between $\eta_{rel}$ 1.1 and 1.3.

The reduction of the treated fiber scraps into a powder can conveniently be carried out by conveying the scraps from the treatment area by means of a worm having a progressively decreasing passage height which worm is coupled with a percussion instrument such as a rotating cutter. This arrangement is especially useful in a continuous process. Because of the brittleness of the fiber material the worm cannot become congested. Other pulverizing means such as beater mills or the like, of course, can be used in place of the worm and rotating cutter.

The attached drawing illustrates apparatus for carrying out the subject process. In the drawing, FIGURE 1 is a diagrammatical representation of apparatus which is suitable for a batch type process, while FIGURE 2 diagrammatically represents equipment that can be used in continuously reducing polyethylene terephthalate scrap to powder.

Figure 2:
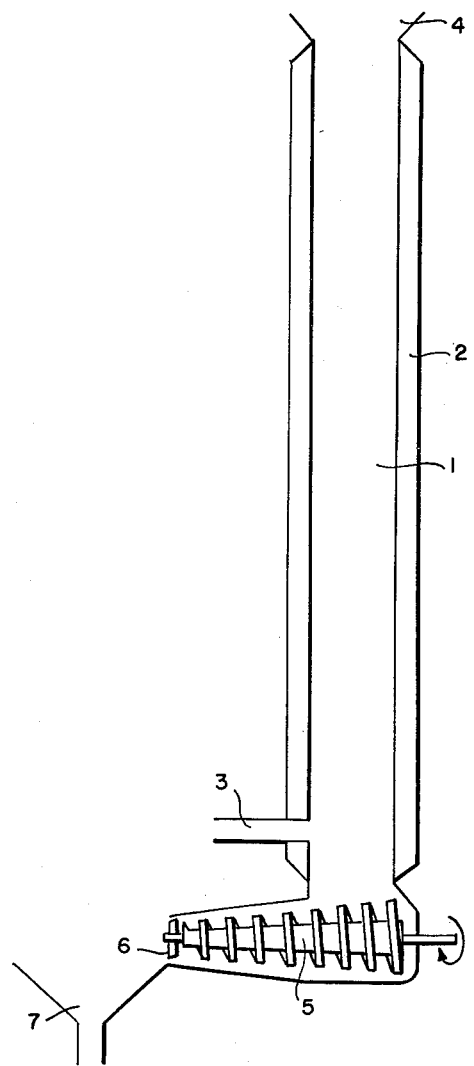

In FIG. 1 polyethylene terephthalate scrap is placed in heated tube 1. The tube is surrounded by heating jacket 2 which preferably maintains a temperature within the tube of from about 220° to about 240° C. Superheated steam flows from inlet 3 through the scrap and out opening 4. The steam at its inlet point can have a temperature of about 240° C. which temperature is lowered to about 220° C. by the time it reaches opening 4. By regulating (1) the temperature of the tube, (2) the steam temperature, and (3) the velocity of flow of the steam, it is possible to control the amount of heat absorbed by the fibers to insure that the temperature of the scrap remains at least 3° C. below its melting point.

The viscosity of the polymer is determined by a sampling procedure. On reaching a viscosity of less than $\eta_{rel}$ 1.4 (preferably 1.1 to 1.3) the supply of steam is cut off. The now brittle fibers are removed from the tube and while still hot are reduced to a powder in a beater mill or by other suitable means.

In a specific embodiment of the method, 1,500 grams of polyethylene terephthalate fiber scrap was placed in a heated tube 1 having an inside diameter of 100 mm. and a length of 2,000 mm. The tube was heated to a temperature of approximately 220° to 240° C. by means of jacket 2. Superheated steam having a temperature of about 270° C. was passed from inlet 3 through the scraps and out opening 4. At opening 4 the temperature of the steam had been reduced to about 220° C. After the flow of steam had been continued for about 15 minutes the relative viscosity of the fibers had been reduced to 1.3. The fibers were then removed from the tube and reduced to a powder while still hot.

FIG. 2 shows an apparatus that can be used for continuously reducing scrap to powder. Polyethylene terephthalate scrap is continuously conveyed into tube 1. The tube is surrounded by a heating jacket 2. Superheated steam introduced at inlet 3 is passed through the scrap and exits at opening 4. The feed of the scrap, the temperature of the heating jacket, the temperature of the steam, and the flow velocity of the steam are regulated in such a manner that the relative viscosity of the polymer at its emergence at the lower end of the tube amounts to less than 1.4 and preferably from about 1.1 to 1.3. Worm 5 is located at the bottom of tube 1. The worm passes the fibers under pressure against rotating cutters 6 which reduce the material to a powder. The powder can then be mixed with methanol and in a known manner be further converted into dimethyl terephthalate.

In addition to providing a highly effective and simplified method of converting the scrap to powder, the subject process also is of advantage because the steam removes most of the textile auxiliary agents which adhere to the fibers. After decomposing the powdered polyester by means of methanol or another known agent, the dimethyl terephthalate that is produced can be used to form polycondensates without initially purifying the dimethyl ester. The precipitated ester has a degree of purity which is far greater than esters produced by processes previously known in the art.

As was indicated above, it is essential to the success of the subject process that the relative viscosity of the polyethylene terephthalate scrap be reduced to less than $\eta_{rel}$ 1.4 and preferably between 1.1 and 1.3 in the heated tube. It is also important that the temperature of the scrap be maintained at least 3° C. below the melting point of the polymer. The temperature of the heated vessel, the temperature of the superheated steam, and the steam-scrap contact time can easily be regulated to give the scrap the proper temperature and relatively viscosity.

Obviously many modifications and variations of the invention as hereinbefore set forth may be made without departing from the spirit and scope thereof, and therefore only such limitations should be imposed as are indicated in the appended claims.

The invention is hereby claimed as follows:

1. A method of converting polyethylene terephthalate scrap into powder form which comprises passing steam heated to from about 220° C. to about 270° C. through said scrap for a sufficient period of time to lower the relative viscosity of the scrap to less than $\eta_{rel}$ 1.4 while maintaining said scrap in a solid state, and thereafter reducing the polyethylene terephthalate to a powder.

2. A method as in claim 1 wherein the relative viscosity of the scrap is reduced to from about $\eta_{rel}$ 1.1 to about 1.3.

3. A continuous process for converting polyethylene terephthalate scrap into powder form which comprises passing said scrap through a vessel heated to a temperature of from about 220° C. to about 240° C., contacting said scrap with a countercurrent flow of superheated steam, regulating the contact time and temperature of the steam so that the scrap will have a relative viscosity of less than about $\eta_{rel}$ 1.4 when it reaches the lower end of said vessel and so that said scrap will be maintained in a solid state, continuously withdrawing the scrap from said vessel and thereafter reducing the polyethylene terephthalate to a powder.

References Cited in the file of this patent

FOREIGN PATENTS 610,183    Great Britain _____ Oct. 12, 1948